United States Patent
Mene et al.

(10) Patent No.: US 12,045,911 B2
(45) Date of Patent: Jul. 23, 2024

(54) PHYSICAL SURROUNDING MODIFICATION USER EXPERIENCE FOR SYNCHRONIZED MIRROR WORLD VR CONTENT

(71) Applicant: INTERNATIONAL BUSINESS MACHINES CORPORATION, Armonk, NY (US)

(72) Inventors: Atul Mene, Morrisville, NC (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 17/659,496

(22) Filed: Apr. 18, 2022

(65) Prior Publication Data
US 2023/0334721 A1    Oct. 19, 2023

(51) Int. Cl.
*G06T 11/00* (2006.01)
*G06F 3/01* (2006.01)

(52) U.S. Cl.
CPC ............... *G06T 11/00* (2013.01); *G06F 3/011* (2013.01); *G06T 2200/24* (2013.01)

(58) Field of Classification Search
CPC ................ G06T 11/00; G06T 2200/24; G06T 19/006; G06T 19/003; G06T 2219/024;
(Continued)

(56) References Cited

U.S. PATENT DOCUMENTS 10,162,177 B2    12/2018    Pedrotti
10,675,766 B1    6/2020    Niemeyer
(Continued)

OTHER PUBLICATIONS

Disclosed Anonymously, "Mechanism for Displaying Three-Dimensional Objects Alongside Video in Virtual Reality," IP.com, Dec. 14, 2017, 8 pages, IP.com No. IPCOM000252053D, Retrieved from the Internet: <URL: https://priorart.ip.com/IPCOM/000252053>.

Disclosed Anonymously, "Method and System for Linking 2D Information Visualization in a Virtual Reality Environment," IP.com, Sep. 27, 2016, 3 pages, IP.com No. IPCOM000247684D, Retrieved from the Internet: <URL: https://priorart.ip.com/IPCOM/000247684>.

(Continued)

*Primary Examiner* — Xilin Guo
(74) *Attorney, Agent, or Firm* — Robert D. Bean (57) ABSTRACT

According to one embodiment, a method, computer system, and computer program product for synchronizing a physical environment with a virtual environment is provided. The present invention may include analyzing a virtual environment to determine one or more physical movements required for a user to navigate within the virtual environment; scanning, with one or more sensors, a physical environment to identify one or more physical movements required for the user to navigate within the physical environment; responsive to determining that the one or more physical movements required for a user to navigate within the virtual environment do not match the one or more physical movements required for a user to navigate within the physical environment, identifying how the physical environment must be modified to incorporate the physical movements of the virtual environment; and communicating the identified modifications to the physical environment to the user.

20 Claims, 6 Drawing Sheets

(58) Field of Classification Search
CPC ............. G06T 2219/2016; G06T 15/10; G06T 7/00; G06T 19/20; G06T 17/00; G06T 7/73; G06T 2219/2004; G06F 3/011; G06F 3/017; G06F 3/04815; G06V 20/20; G06V 40/28; G06V 40/197; G06V 40/23; G06V 2201/12; H04L 67/535; H04L 65/4038

See application file for complete search history.

(56) References Cited

U.S. PATENT DOCUMENTS

| | | | |
|---|---|---|---|
| 11,158,126 B1* | 10/2021 | Petrov | G06F 3/012 |
| 2012/0050325 A1 | 3/2012 | Joo | |
| 2016/0253842 A1 | 9/2016 | Shapira | |
| 2019/0266404 A1 | 8/2019 | Spivack | |
| 2020/0200416 A1* | 6/2020 | Granger | G16H 40/67 |
| 2020/0201514 A1 | 6/2020 | Murphy | |
| 2020/0250889 A1 | 8/2020 | Li | |
| 2020/0312031 A1* | 10/2020 | Huang | G06F 3/011 |

OTHER PUBLICATIONS

Disclosed Anonymously, "Presenting a Limited Avatar of a User in a Virtual Reality Environment," IP.com, Dec. 15, 2017, 7 pages, IP.com No. IPCOM000252117D, Retrieved from the Internet: <URL: https://priorart.ip.com/IPCOM/000252117>.

Matsuda, "Mirrorworlds," Leap Motion Blog [online], Jul. 14, 2018 [accessed on Aug. 17, 2021], 9 pages, Ultraleap, Retrieved from the Internet: <URL: https://blog.leapmotion.com/mirrorworlds/>.

Mell, et al., "The NIST Definition of Cloud Computing", National Institute of Standards and Technology, Special Publication 800-145, Sep. 2011, 7 pages.

Nuernberger, et al., "SnapToReality: Aligning Augmented Reality to the Real World," CHI '16: Proceedings of the 2016 CHI Conference on Human Factors in Computing Systems, May 2016, pp. 1233-1244, ACM 978-1-4503-3362-Jul. 16, 2005, Retrieved from the Internet: <URL: https://doi.org/10.1145/2858036.2858250>.

Re, et al., "Augmented Reality Interactive System to Support Space Planning Activities." International Conference on Virtual, Augmented and Mixed Reality [lecture notes], 2013, pp. 291-300, vol. 8022, Springer, Retrieved from the Internet: <URL: https://doi.org/10.1007/978-3-642-39420-1_31>.

* cited by examiner

FIG. 6

PHYSICAL SURROUNDING MODIFICATION USER EXPERIENCE FOR SYNCHRONIZED MIRROR WORLD VR CONTENT

BACKGROUND

The present invention relates, generally, to the field of computing, and more particularly to mixed reality.

Mixed reality is a field concerned with merging real and virtual worlds such that physical and digital objects co-exist and interact in real time. Mixed reality does not exclusively take place in either the physical or virtual worlds but is a hybrid of reality and virtual reality; as such, mixed reality describes everything in the reality-virtuality continuum except for the two extremes, namely purely physical environments and purely virtual environments. Accordingly, mixed reality includes augmented virtuality (AV), augmented reality (AR) and virtual reality (VR). Mixed reality has found practical applications in remote working, military and commercial training, games, and hybrid amusement-park-style rides.

SUMMARY

According to one embodiment, a method, computer system, and computer program product for synchronizing a physical environment with a virtual environment is provided. The present invention may include analyzing a virtual environment to determine one or more physical movements required for a user to navigate within the virtual environment; scanning, with one or more sensors, a physical environment to identify one or more physical movements required for the user to navigate within the physical environment; responsive to determining that the one or more physical movements required for a user to navigate within the virtual environment do not match the one or more physical movements required for a user to navigate within the physical environment, identifying how the physical environment must be modified to incorporate the physical movements of the virtual environment; and communicating the identified modifications to the physical environment to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to mixed reality. The following described exemplary embodiments provide a system, method, and program product to, among other things, identify and communicate ways in which the structure of a physical environment must be altered to match a virtual environment. Therefore, the present embodiment has the capacity to improve the technical field of mixed reality by providing a means to automatically identify and detect discrepancies between a physical and virtual environment and communicate methods of remedying those discrepancies to a user.

As previously described, mixed reality is a field concerned with merging real and virtual worlds such that physical and digital objects co-exist and interact in real time. Mixed reality does not exclusively take place in either the physical or virtual worlds but is a hybrid of reality and virtual reality; as such, mixed reality describes everything in the reality-virtuality continuum except for the two extremes, namely purely physical environments and purely virtual environments. Accordingly, mixed reality includes augmented virtuality (AV), augmented reality (AR) and virtual reality (VR). Mixed reality has, for example, found practical applications in remote working, military and commercial training, games, and simulation.

One expression of mixed reality is that of mirror worlds; mirror worlds are alternative virtual dimensions of reality, layered over the physical world. Rather than completely removing objects and environmental features from the user's environment, a mirror world experience may transform objects and environmental features in the user's surroundings into virtual alternatives by layering virtual objects or environmental features over them. For example, physical obstacles like cabinets and chairs may become virtual mountains that can be moved to affect a virtual weather system; a door to a hallway may become the yawning mouth of a foreboding cave, and a pet dog may become a fire-breathing dragon. Mirror worlds transform aspects of the physical world into a new experience, rather than augmenting or replacing them.

In a mirror world, typically the virtual environment is changed to accommodate the physical environment. For example, a mixed reality system may analyze the physical environment to ascertain the position of different obstacles, the presence and/or route of moving objects, environmental features such as stairs, walls, hills, et cetera, and adjust the virtual environment accordingly, for instance by converting a table into a mountain, as a user will not be able to move through the table. However, in some situations, it is the physical environment that must be changed to accommodate the virtual environment. An example of such a situation may be in the context of shooting a movie, where virtual content has already been created and the physical environment of the film set must be modified to accommodate the structures and terrain of the virtual environment such that users such as actors can move around in the physical environment just as they can move in the virtual environment. As such, there exists a need for a system capable of analyzing a virtual environment and identifying how a physical environment needs to be modified such that a user's mobility in the physical world can be synchronized with mobility in the virtual environment of the mirror world.

According to one embodiment, the invention is a method of analyzing a virtual environment to identify physical movements a user can make to navigate the virtual environment, scan a physical environment to determine physical movements a user can make to navigate the physical environment, identify how the physical environment may be altered to synchronize the physical movements of the virtual environment with the physical environment, and communicate those changes to a user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify and communicate ways in which the structure of a physical environment must be altered to match a virtual environment.

Figure 1:
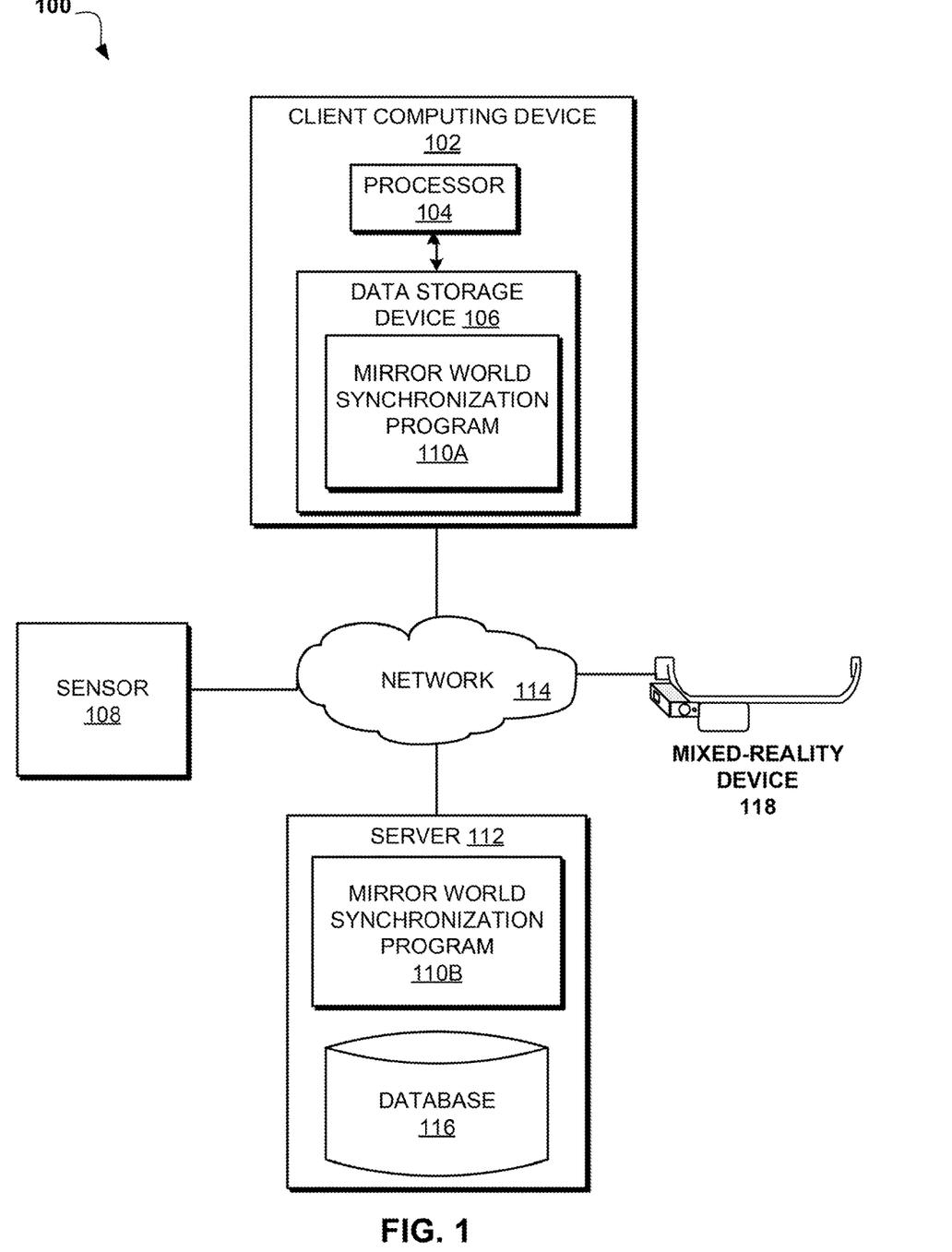
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, sensor 108, mixed reality device 118, and a server 112 interconnected via a communication network 114. According to at least one implementation, the networked computer environment 100 may include a plurality of client computing devices 102, sensors 108, mixed reality devices 118 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a mirror world synchronization program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a mirror world synchronization program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Sensor 108 may be any number or combination of sensors capable of recording data pertaining to a physical environment which may be used to identify objects and environmental features in the physical environment. Sensor 108 may include visual or infrared cameras, sonar, lidar, ultrasound, et cetera. Sensor 108 may be capable of communicating with mirror world synchronization program 110A, 110B. Sensor 108 may be integrated into mixed reality device 118, client computing device 102, server 112, and/or may be disposed within the physical environment.

Mixed reality device 118 may be any device which allows a user to perceive a mixed reality environment; the mixed reality device 118 may be any device equipped with a display that can render a virtual environment, and hardware or software that enables the device to track its location and motion relative to the physical world, and by extension relative to virtual objects mapped to locations in the physical world. The mixed reality device 118 may be a general-purpose device owned by users or may be customized or specialized for an individual mixed reality experience or class of mixed reality experiences. Mixed reality devices 118 may include such devices as VR headsets, AR headsets, smart glasses, tablets, mobile phones, et cetera. Users may wear or utilize mixed reality devices 118 while experiencing the mixed reality environment. Mixed reality device 118 may be enabled to communicate with mirror world synchronization program 110A, 110B residing within client computing device 102 and/or server 112 via the communication network 114, in accordance with one embodiment of the invention.

According to the present embodiment, the mirror world synchronization program 110A, 110B may be a program capable of identify and communicate ways in which the structure of a physical environment must be altered to match a virtual environment. The mirror world synchronization program 110A, 110B may be located on client computing device 102 or server 112 or on any other device located within network 114. Furthermore, mirror world synchronization program 110A, 110B may be distributed in its operation over multiple devices, such as client computing device 102 and server 112. The mirror world synchronization method is explained in further detail below with respect to FIG. 2.

Figure 2:
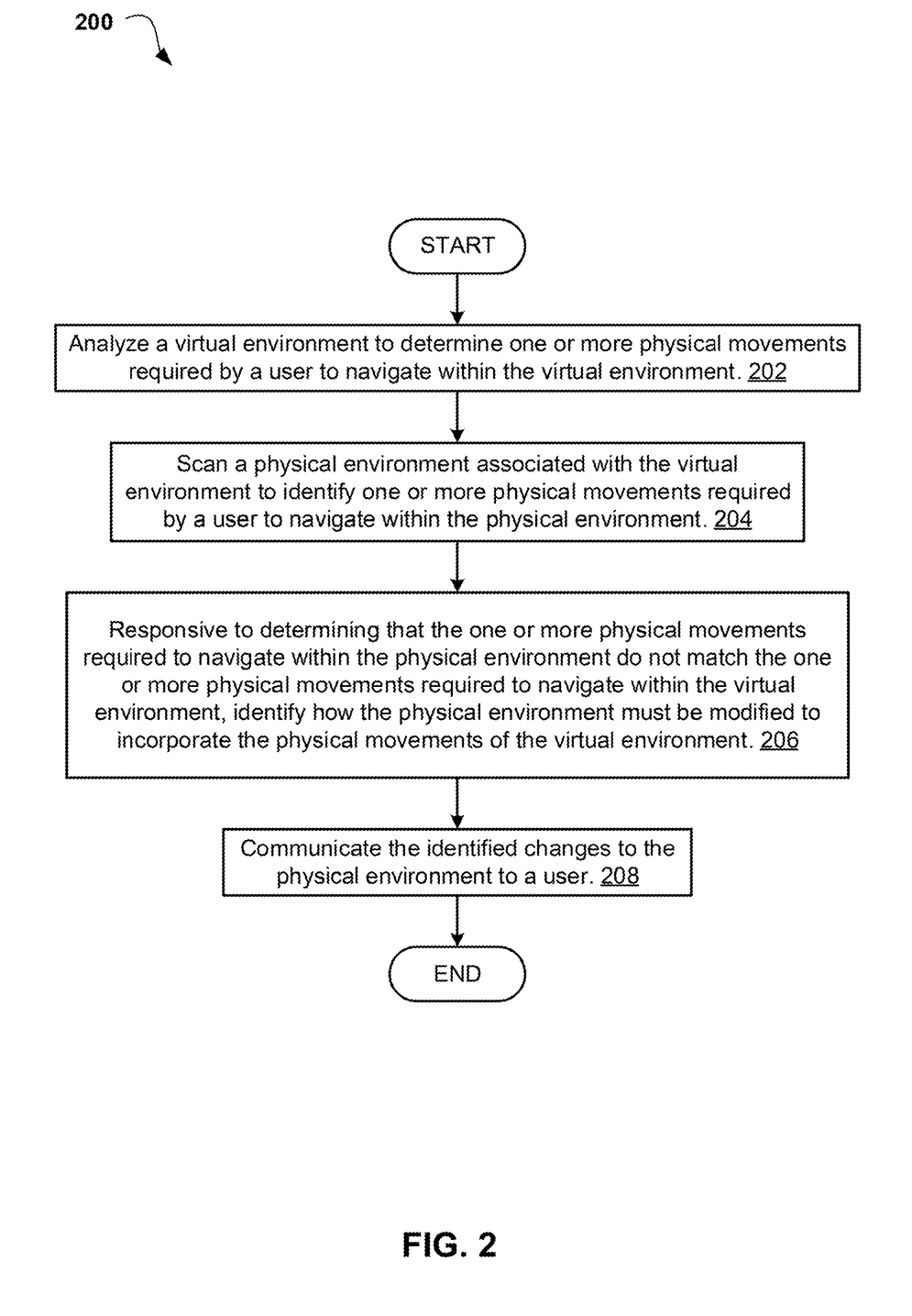
FIG. 2 is an operational flowchart illustrating a mirror world synchronization process according to at least one embodiment.

Referring now to FIG. 2, an operational flowchart illustrating a mirror world synchronization process 200 is depicted according to at least one embodiment. At 202, the mirror world synchronization program 110A, 110B may analyze a virtual environment to determine one or more physical movements required by a user to navigate within the virtual environment. Here, the mirror world synchronization program 110A, 110B may utilize video or image analysis programs to analyze the virtual content to extract the physical movements required by a user to navigate the virtual environment. The mirror world synchronization program 110A, 110B may determine physical movements by analyzing archived or real-time footage or rendering of a user moving within the virtual environment, and/or through controlling a virtual agent that interacts with the virtual environment as a user would, and/or by soliciting and recording feedback from one or more users, a creator of the virtual content, a director of a VR movie, and other individuals. Physical movements in the virtual environment may include movements possible in the virtual environment, such as climbing stairs, walking, running, et cetera. In many cases, the physical movements may correspond to structures or environmental features within the virtual content; for example, climbing might be possible in the virtual environment due to the presence of a ladder, scalable rock face, monkey bars, et cetera. Running may be possible due to the presence of open space, climbing stairs may be made possible by the presence of a ramp or stairs, et cetera. The mirror world synchronization program 110A, 110B may note the presence and location of such structures within the virtual environment and the physical actions by which the user may interact with the structures. The mirror world synchronization program 110A, 110B may note the location within the virtual environment where movements by the user take place. The mirror world synchronization program 110A, 110B may classify each movement possible in the virtual environment or may classify each movement performed by one or more users designated as actors.

In some embodiments of the invention, mirror world synchronization program 110A, 110B may identify one or more properties of the physical movements, where the properties are qualities of the movement that distinguish the movement, and which may be relevant to determining structural requirements of a physical environment. For example, the mirror world synchronization program 110A, 110B may identify further properties of the physical movement of running such as the length of the user's step, the user's speed, the length of time the user is running, et cetera.

At 204, mirror world synchronization program 110A, 110B may scan a physical environment associated with the virtual environment to identify one or more physical movements required by a user to navigate within the physical environment. The mirror world synchronization program 110A, 110B may utilize one or more sensors 108 to scan the physical environment and identify objects and environmental features in the physical environment. The mirror world synchronization program 110A, 110B may identify the position and shape of objects and environmental features relative to each other in the physical environment. The mirror world synchronization program 110A, 110B may associate particular physical movements with particular objects and/or environmental features. As such, the mirror world synchronization program 110A, 110B may build a map of the physical environment and the actions possible within it based, for example, on the particular objects, structures, environmental features, et cetera disposed within the physical environment.

At 206, mirror world synchronization program 110A, 110B may, responsive to determining that the one or more physical movements required to navigate within the physical environment do not match the one or more physical movements required to navigate within the virtual environment, identify how the physical environment must be modified to incorporate the physical movements of the virtual environment. The mirror world synchronization program 110A, 110B may compare the list of physical movements required to navigate the virtual space, and/or the location and/or structures where those physical movements take place, and compare the list against the list of physical movements that can be used to navigate the physical space based on the position and type of objects, environmental features, structures, et cetera, to determine whether all physical movements required to navigate within the virtual environment are possible in the same locations in the virtual environment. If all physical movements required to navigate within the virtual environment are not possible in the same locations in the virtual environment, the mirror world synchronization program 110A, 110B may identify the location and movements within the virtual environment that do not match those of the physical environment and identify structures that would have to be added or subtracted to the physical environment to enable the movement at that location within the physical environment. In some embodiments of the invention, the mirror world synchronization program 110A, 110B may identify one or more changes to existing structures, objects, or environmental features to enable the physical movement. In some embodiments of the invention, mirror world synchronization program 110A, 110B may identify changes to the physical environment based on determining how to minimally change the physically surroundings to enable the physical actions of the virtual environment that are not enabled within the physical environment. This may include identifying where existing physical structures can be moved and/or reused to enact identified changes.

In some embodiments of the invention, mirror world synchronization program 110A, 110B may take into account the safety requirements of the physical structures being added or modified within the physical environment based on the actions and may incorporate safety features into the identified structures or modifications identified as necessary within the physical environment. For example, mirror world synchronization program 110A, 110B may add railings to an elevated walkway structure even where they aren't present in the virtual environment. In some embodiments of the invention, the safety features may additionally be based on the age, weight, and/or medical conditions of the users and/or actors, and/or may be based on the number of actors and type of movement.

At 208, mirror world synchronization program 110A, 110B may communicate the identified changes to the physical environment to a user. The mirror world synchronization program 110A, 110B may communicate the identified changes to a user's client computing device 102 in the form of a diagram, text, and/or graphics. The mirror world synchronization program 110A, 110B may also transmit the identified changes to the user's mixed reality device 118, which may overlay the identified changes onto the physical environment. In some embodiments, the mirror world synchronization program 110A, 110B may communicate or overlay onto a physical environment using a mixed-reality device 118 a sequence of steps required to enact the identified changes in the physical environment. In some embodiments of the invention, mirror world synchronization program 110A, 110B may communicate to the user where existing physical structures can be moved and/or reused to enact the identified changes.

Figure 3:
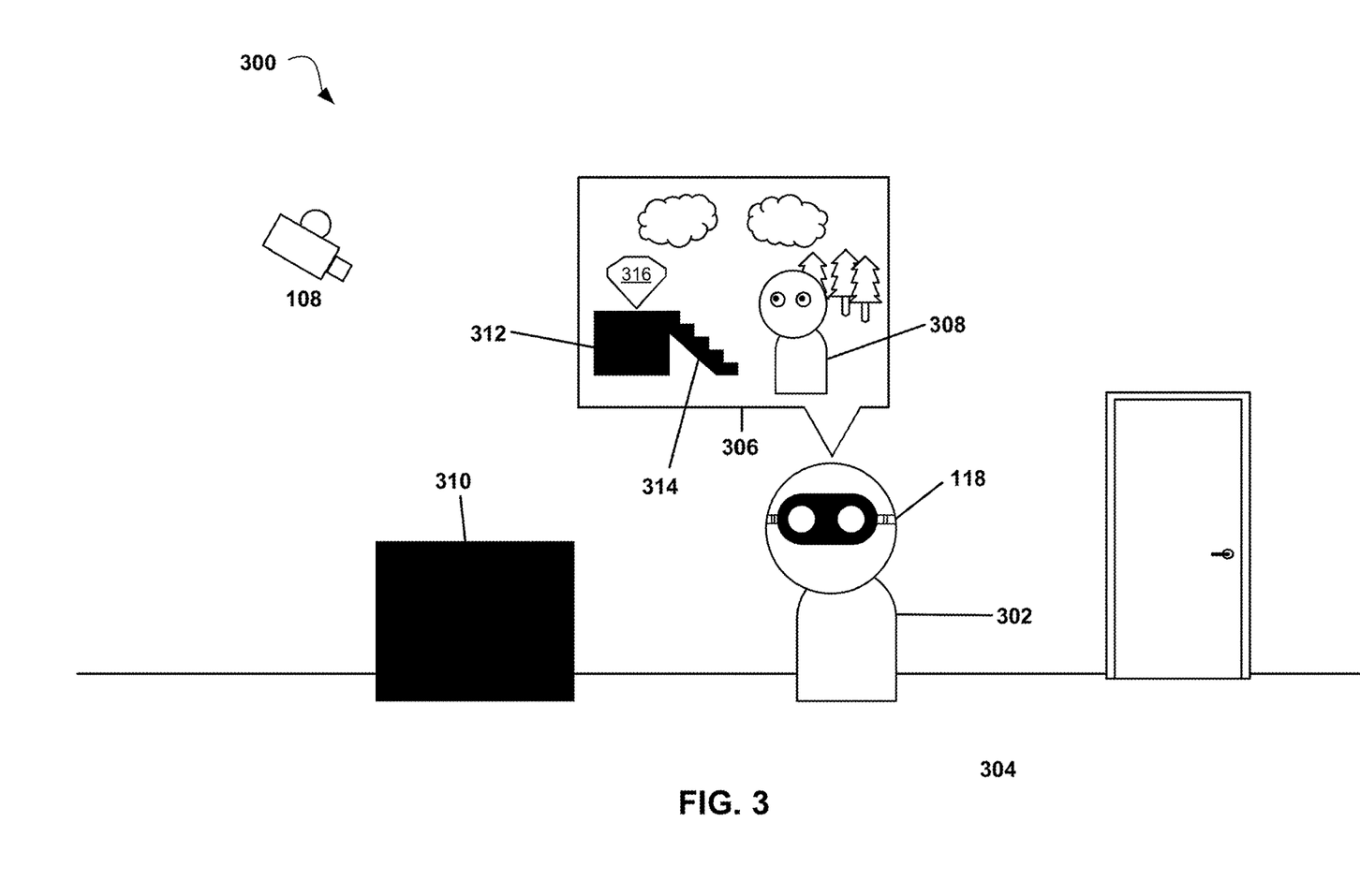
FIG. 3 is a diagram illustrating an exemplary implementation of a system executing a mirror world synchronization process according to at least one embodiment.

Referring now to FIG. 3, a diagram illustrating an exemplary implementation 300 of a system executing a mirror world synchronization process 200 is depicted according to at least one embodiment. Here a user 302, who may be an actor in a virtual movie, is standing in a physical environment 304, which here is an indoor set, and is wearing a mixed-reality headset 118 by which he is immersed in virtual content 306, which here is a forested outdoor environment. The user 302 is represented in the virtual content 306 by an avatar 308, which mimics the movement of the user 302 and occupies a location in the virtual content 306 which is tied to and corresponds with the position of the user 302 in the physical environment 304. Here, the virtual content 306 comprises a platform 312, and stairs 314 leading up to the platform 312. The mirror world synchronization program 110A, 110B may analyze the virtual content 306 and identify that within the virtual content 306, the avatar 308 may move up the stairs 314 and onto the platform 312. In some embodiments, for example where the virtual content 306 is a movie, mirror world synchronization program 110A, 110B may identify that in the movie the avatar 308 must climb the stairs 314 to grab the diamond 316 on the platform 312. The mirror world synchronization program 110A, 110B may utilize camera 108 to scan the physical environment 304 and may recognize that while there is a platform 310 within the physical environment in the same size and relative location as the platform 312 within the virtual content, such that the same movement on a platform is possible in both the virtual content 306 and the physical environment 304. The mirror world synchronization program 110A, 110B may also recognize that the physical environment 304 lacks any physical equivalent of the virtual stairs 314 in the virtual content 306, such that the user 302 may not move up to the top of platform 310 in the same way that the avatar 308 is capable of moving up the stairs 314 to platform 312. Accordingly, mirror world synchronization program 110A, 110B may identify physical structures of the correct size, width, and incline to allow for the same ascending/descending movement as stairs 314, such as a ramp, stairs, boxes of ascending height, et cetera, and choose a location and orientation of the structure to match the stairs 314 and/or to enable the same ascending/descending movement made possible by stairs 314. The mirror world synchronization program 110A, 110B may communicate the proposed structure to the user 302, for example by placing a virtual "ghost" of the structure, or a translucent model of the structure, in an augmented reality environment in the same location, position, and orientation that the proposed physical structure would occupy upon completion.

It may be appreciated that FIGS. 2-3 provide only illustrations of individual implementations and do not imply any limitations with regard to how different embodiments may be implemented. Many modifications to the depicted environments may be made based on design and implementation requirements.

Figure 4:
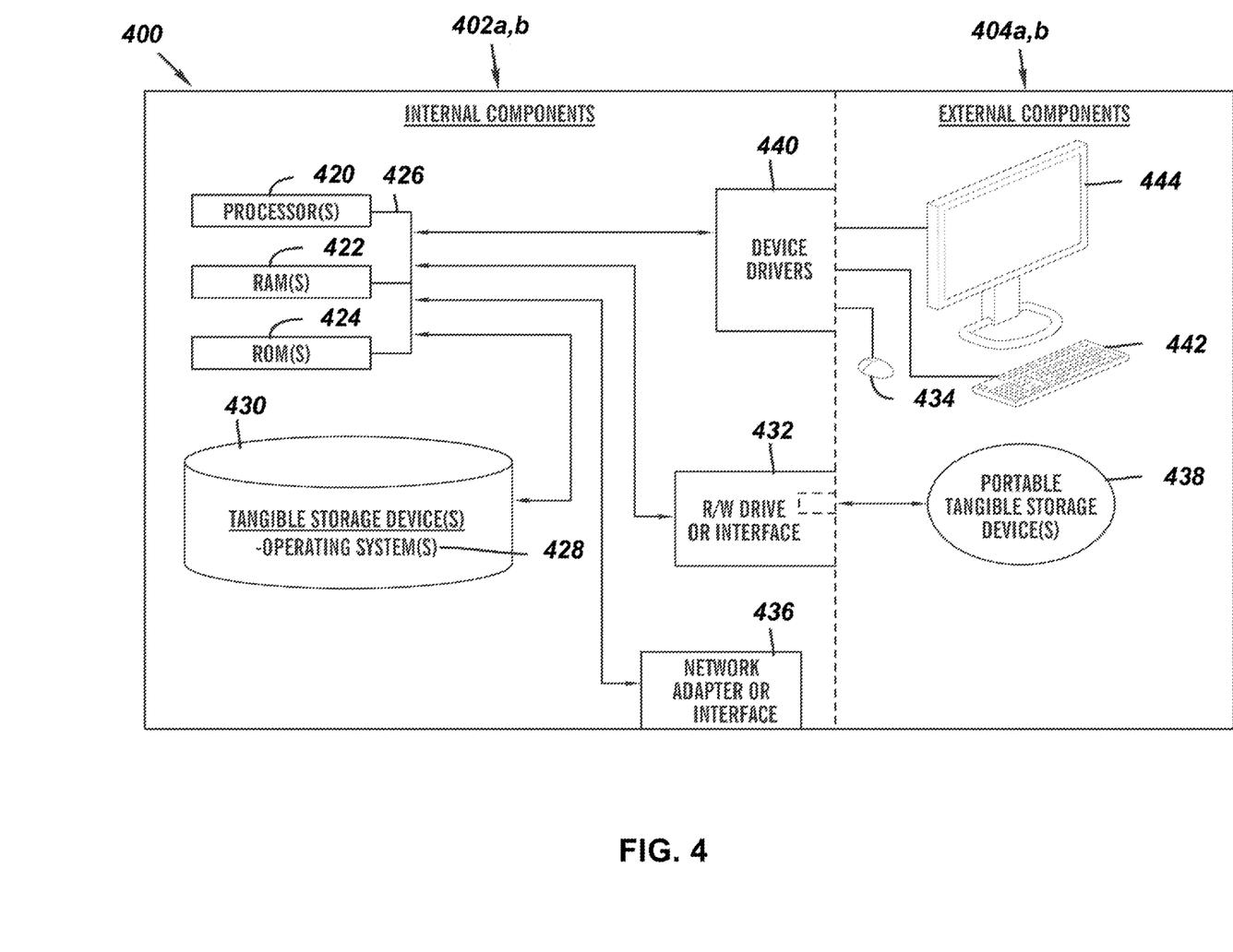
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the mirror world synchronization program 110A in the client computing device 102, and the mirror world synchronization program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the mirror world synchronization program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The mirror world synchronization program 110A in the client computing device 102 and the mirror world synchronization program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the mirror world synchronization program 110A in the client computing device 102 and the mirror world synchronization program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
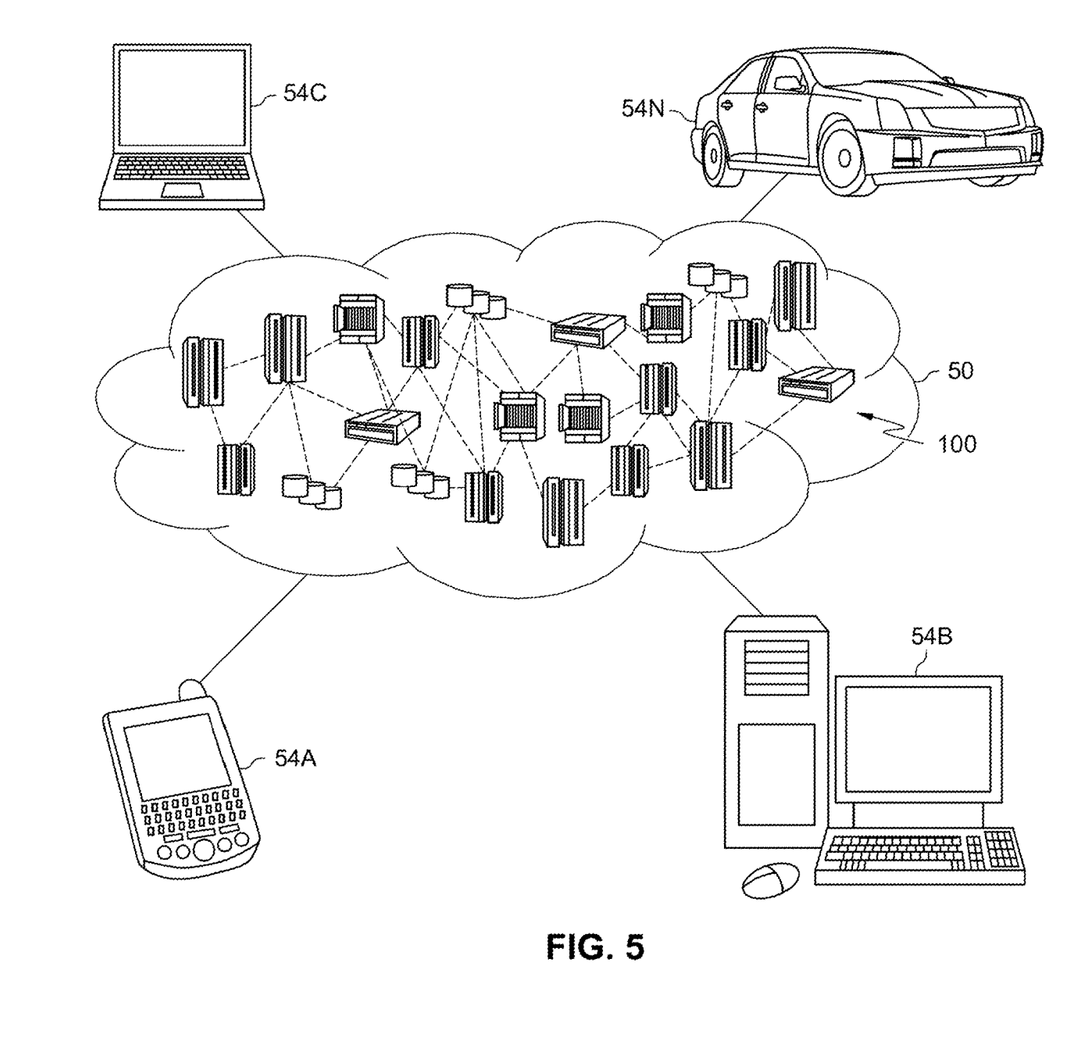
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
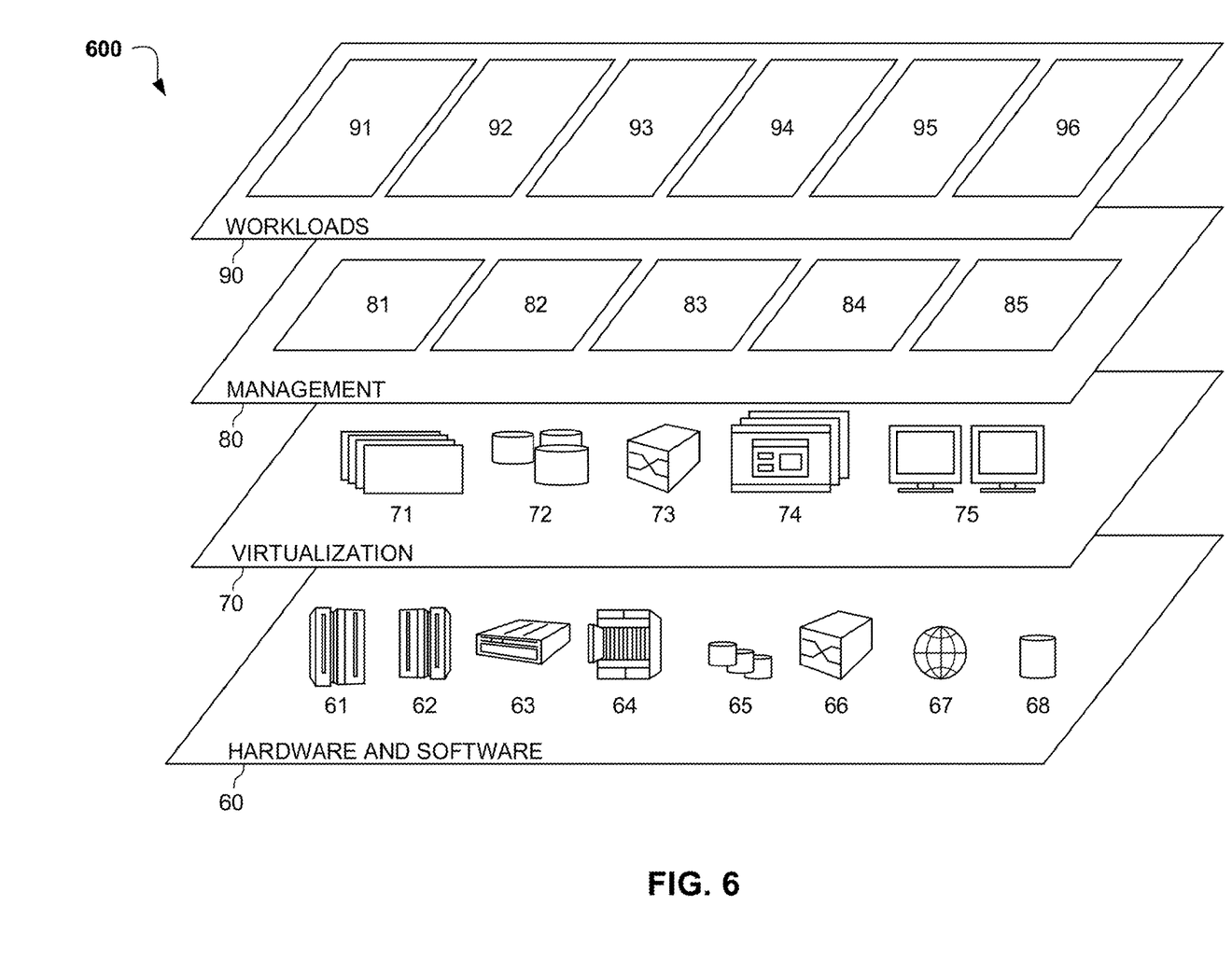
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mirror world synchronization 96. The mirror world synchronization 96 may be enabled to identify and communicate ways in which the structure of a physical environment must be altered to match a virtual environment.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for synchronizing a physical environment with a virtual environment, the method comprising:
    analyzing the virtual environment to determine one or more physical movements required for a user to navigate within the virtual environment;
    scanning, with one or more sensors, the physical environment to identify one or more physical movements required for the user to navigate within the physical environment;
    responsive to determining that the one or more physical movements required for a user to navigate within the virtual environment do not match the one or more physical movements required for a user to navigate within the physical environment, identifying how one or more objects in the physical environment must be modified to incorporate the physical movements of the virtual environment; and
    communicating the identified modifications to the physical environment to the user.

2. The method of claim 1, further comprising:
    communicating to the user where existing physical structures may be reused to enact the identified modifications.

3. The method of claim 1, wherein the identified modifications are based on identifying how the virtual environment can be navigated with minimum change in the physical environment.

4. The method of claim 1, wherein the identified modifications comprise one or more safety features.

5. The method of claim 1, wherein the identified modifications comprise one or more safety features identified based on the age, weight, or health of the user.

6. The method of claim 1, further comprising:
    communicating to the user a sequence of steps for enacting the one or more identified modifications.

7. The method of claim 1, wherein the virtual environment is a mirror world mirroring the physical environment.

8. A computer system for synchronizing a physical environment with a virtual environment, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        analyzing the virtual environment to determine one or more physical movements required for a user to navigate within the virtual environment;
        scanning, with one or more sensors, the physical environment to identify one or more physical movements required for the user to navigate within the physical environment;
        responsive to determining that the one or more physical movements required for a user to navigate within the virtual environment do not match the one or more physical movements required for a user to navigate within the physical environment, identifying how one or more objects in the physical environment must be modified to incorporate the physical movements of the virtual environment; and
        communicating the identified modifications to the physical environment to the user.

9. The computer system of claim 8, further comprising:
    communicating to the user where existing physical structures may be reused to enact the identified modifications.

10. The computer system of claim 8, wherein the identified modifications are based on identifying how the virtual environment can be navigated with minimum change in the physical environment.

11. The computer system of claim 8, wherein the identified modifications comprise one or more safety features.

12. The computer system of claim 8, wherein the identified modifications comprise one or more safety features identified based on the age, weight, or health of the user.

13. The computer system of claim 8, further comprising:
    communicating to the user a sequence of steps for enacting the one or more identified modifications.

14. The computer system of claim 8, wherein the virtual environment is a mirror world mirroring the physical environment.

15. A computer program product for synchronizing a physical environment with a virtual environment, the computer program product comprising:
    one or more computer-readable tangible storage medium and program instructions stored on at least one of the one or more tangible storage medium, the program instructions executable by a processor to cause the processor to perform a method comprising:

analyzing the virtual environment to determine one or more physical movements required for a user to navigate within the virtual environment;

scanning, with one or more sensors, the physical environment to identify one or more physical movements required for the user to navigate within the physical environment;

responsive to determining that the one or more physical movements required for a user to navigate within the virtual environment do not match the one or more physical movements required for a user to navigate within the physical environment, identifying how one or more objects in the physical environment must be modified to incorporate the physical movements of the virtual environment; and communicating the identified modifications to the physical environment to the user.

16. The computer program product of claim 15, further comprising: communicating to the user where existing physical structures may be reused to enact the identified modifications.

17. The computer program product of claim 15, wherein the identified modifications are based on identifying how the virtual environment can be navigated with minimum change in the physical environment.

18. The computer program product of claim 15, wherein the identified modifications comprise one or more safety features.

19. The computer program product of claim 15, wherein the identified modifications comprise one or more safety features identified based on the age, weight, or health of the user.

20. The computer program product of claim 15, further comprising: communicating to the user a sequence of steps for enacting the one or more identified modifications.

* * * * *